Dec. 2, 1969    W. P. MOORE ET AL    3,481,702
PRODUCTION OF MAGNESIUM OXIDE BY A FLUIDIZED BED PROCESS
Filed March 17, 1967
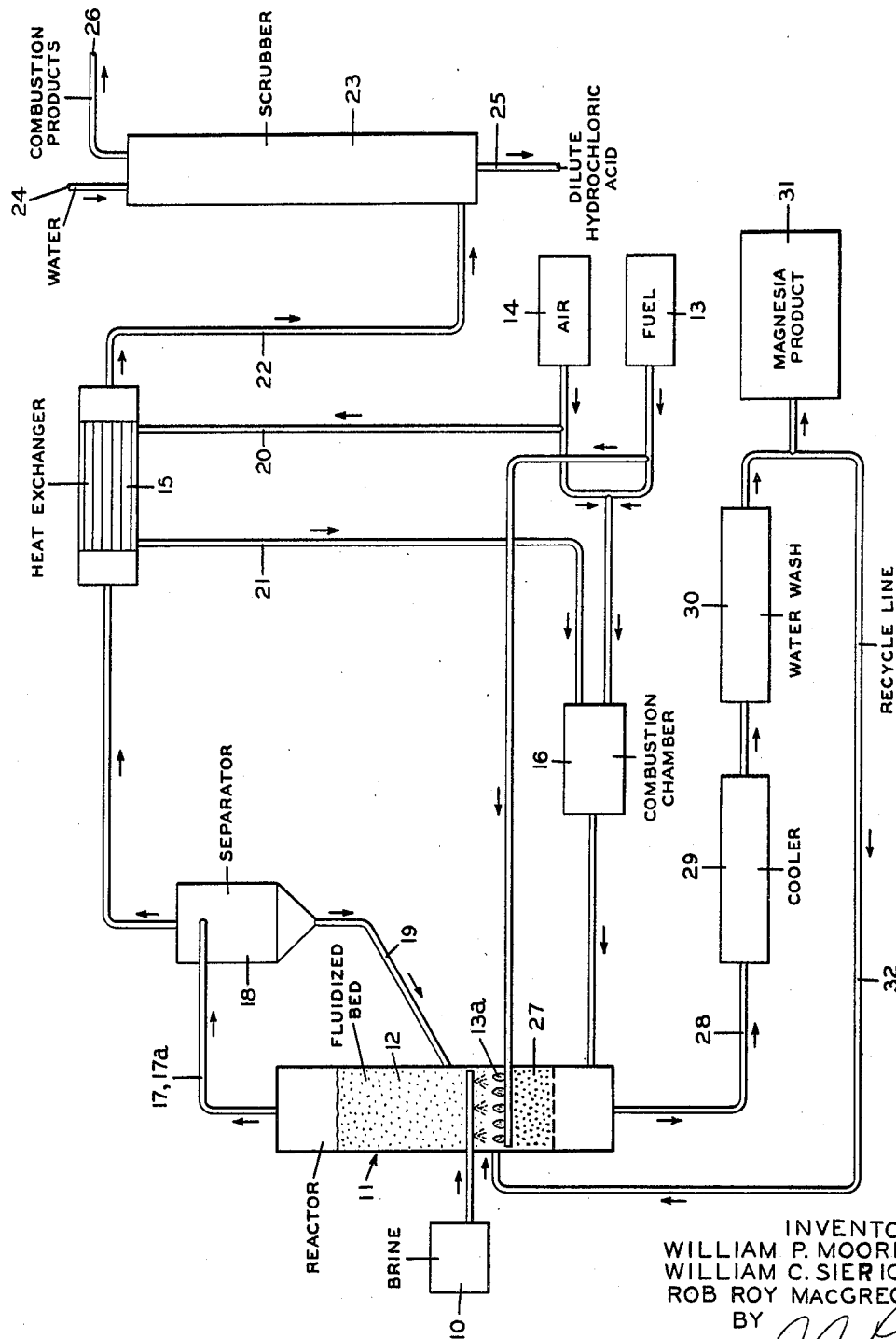
INVENTORS:
WILLIAM P. MOORE
WILLIAM C. SIERICHS
ROB ROY MACGREGOR
BY
ATTORNEY United States Patent Office 3,481,702
Patented Dec. 2, 1969

3,481,702
PRODUCTION OF MAGNESIUM OXIDE BY A FLUIDIZED BED PROCESS
William Percy Moore, Chester, and William Cornell Sierichs and Rob Roy MacGregor, Hopewell, Va., assignors to Allied Chemical Corporation, New York, N.Y., a corporation of New York
Filed Mar. 17, 1967, Ser. No. 625,279
Int. Cl. C01f 5/14
U.S. Cl. 23—201                    1 Claim

ABSTRACT OF THE DISCLOSURE

A method of producing high grade magnesium oxide from magnesium chloride brine containing calcium chloride utilizing a fluidized bed wherein magnesium chloride is hydrolyzed to form the magnesium oxide and a by-product hydrogen chloride. Magnesium oxide from the fluidized bed is washed with water to remove calcium chloride, and part of the washed product is recycled to the bed to lower the calcium chloride content and prevent particles in the bed from sticking together.

BACKGROUND OF THE INVENTION

This invention relates to the production of particles of magnesium oxide, and particularly to the continuous production of magnesium oxide particles of low calcium oxide content from magnesium chloride-rich brines which are contaminated with calcium chloride.

It is well known that magnesium chloride can be thermally decomposed in the presence of water to form magnesium oxide and hydrochloric acid. Although the theoretical basis of the reaction is well known, adaptation of the reaction to an economical commercial process has not been entirely satisfactory. Magnesium chloride hydrate melts at about its decomposition temperature, particularly if contaminated, thus forming an agglomerate mass which is difficult to handle, resulting in poor reaction rates and inefficiencies.

It has been proposed in U.S. Patent 3,251,650 that the problem of agglomeration may be avoided by using a fluidized bed of heated refractory particles wherein magnesium chloride hydrate contacts the particles and is converted to a porous magnesium oxide ash which is carried away from the reaction zone by exit gases. It has been found, however, that in such a process if the magnesium chloride is contaminated with significant proportions of calcium chloride, a magnesium oxide product results which contains significant amounts of calcium oxide as an impurity, which impurity is difficult to separate from the desired magnesium oxide product. Since brines rich in magnesium chloride, but highly contaminated with calcium chloride, are available at relatively low cost, e.g., as intermediates or by-products in the recovery of mineral values from salt lakes, it is advantageous to produce high grade magnesium oxide from such brines.

Accordingly, it is an object of this invention to provide an improved process for the production of magnesium oxide of relatively high purity from magnesium chloride sources which also contain calcium chloride.

It is a further object of this invention to provide a continuous process for the efficient production of magnesium oxide in particulate form, which is substantially free of calcium oxide, from magnesium chloride-rich brines which are solutions or slurries contaminated with calcium chloride.

It is an additional object of this invention to provide a process for the concurrent production of dilute hydrogen chloride and magnesium oxide of relatively high purity.

SUMMARY OF THE INVENTION

We have found that these and other objects are obtained by a process which, in general, comprises treating an aqueous solution or slurry of magnesium chloride-rich brines contaminated with calcium chloride in a reactor containing a fluidized bed of particles consisting essentially of magnesium oxide. The particles are maintained in a fluidized state by upward passage of gases at elevated temperatures. In processing, the brine solids coat the particles of the fluidized bed; the magnesium chloride in the brine solids coating substantially converts to magnesium oxide and hydrogen chloride, while the calcium chloride of the brine remains essentially unconverted; and the particles increase in size due to the build-up of coating and agglomeration of particles until they drop out of the fluidized bed whereupon they are recovered. The resultant particulate product is rich in magnesium oxide with a relatively low content of calcium oxide. If desired, the resultant particulate product may be further refined by water washing to reduce the content of residual salts, such as calcium chloride. Using this procedure, a product can be produced having a calcium oxide content of no greater than 2 weight percent, preferably no greater than about 1 weight percent, based on the weight of the product.

Hydrogen chloride is produced during the process and carried away from the fluidized bed by the exiting gases. The hydrogen chloride may be recovered by well known means, e.g., by dissolving in water to form dilute hydrochloric acid, which if desired may be concentrated by evaporating off water.

During the process a minor portion of the brine forms a light ash which is carried off with exiting gases. This light ash has a desirably high magnesium oxide content and can be recovered for use as a magnesium oxide-rich product, or recycled to the fluidized bed.

A suitable brine for use as feeds in our process is of the magnesium chloride-rich type having a magnesium chloride content of from about 10 to 60 weight percent, preferably 25 to 50 weight percent, based on the weight of the brine. The brine may be in the form of either an aqueous solution or a slurry. Where the brine is a slurry, at least part of the solids will exist in the form of hydrates, such as $MgCl_2 \cdot 6H_2O$. However, in describing the proportions of chemical constituents of the brine solids, water of hydration is excluded and the proportions of the constituents are described based on their anhydrous forms. The calcium chloride constitutes from about 10 to 30 weight percent, preferably 15 to 25 weight percent, based on the weight of the magnesium chloride component of the brine.

The fluidized bed is comprised mainly of magnesium oxide and calcium chloride, rather than the usual alumina or silica compounds, since the latter compounds tend to cause any calcium chloride present in the brine to decompose to calcium oxide, which contaminates the magnesium oxide product and is difficult to remove. The bed is comprised of particles having a magnesium oxide content of at least 75 weight percent and a calcium chloride content of no more than about 20 weight percent, based on the weight of the particles. The size of the particles in the fluidized zone are advantageously from about 6 to 50 mesh. However, particles of a wider size distribution may be fed to the fluidized zone, the under size particles being carried away from the zone by the exiting gas and recycled to the zone for assuring the presence of nuclei therein for building new magnesia particles and thus assuring a continuous operation. The over-size particles will drop out of the zone and be recovered along with the resultant product.

The particles suitable for use in the fluidized zone are those composed of at least about 75 weight percent of magnesium oxide and no more than 20 weight percent of calcium chloride; preferably, the particles are about 80 weight percent of magnesium oxide and no more than about 15 weight percent of calcium chloride, based on the total weight of the particles. It has been found that the presence of a high amount of calcium chloride in the particles will cause the latter to undesirably stick together.

The gases employed in maintaining the fluidized zone should preferably be essentially unreactive with the constituents of the brine, and include air and mixtures of air and combustion products of propane, natural gas, oil or other fuels. One of the components of the upwardly moving gas is steam which is derived from the aqueous portion of the brine as well as the water of hydration of any solid salts. Another component is HCl generated by the decomposition of the magnesium chloride. It is advantageous to produce the gas for the fluidization by supplying air and burning fuel directly in the fluidized bed so as to provide a maximum utilization of fuel in the process and to obtain an exceptional rapid heat transfer of the reactants. It is preferable to maintain the pressure in the reactor at near atmospheric, e.g., about 3 to 7 p.s.i.g., and the flow of gas at a velocity of from about 5 to 8 feet per second. The fluidized zone should be maintained at temperatures of from about 525 to 950° C., preferably 700 to 950° C.

BRIEF DESCRIPTION OF THE DRAWING

The drawing is a schematic illustration of the invention according to the process.

DESCRIPTION OF THE PREFERRED EMBODIMENT

Magnesium chloride brine contaminated with calcium chloride is fed from a source 10, preferably of the spray type, into a fluidized reactor 11 containing a bed 12 of magnesium oxide-calcium chloride particles. Preferably, the brine is fed into the reactor 11 at a location other than that above the fluidized bed in order to achieve a good contact with the bed particles therein which are heated by combustion products from combustion chamber 16, said combustion products being derived from burning in the combustion chamber by fuel and air passing from sources 13, 14, and 15. The rate of $MgCl_2$ feed is controlled by suitable means, not shown, to avoid surpassing the heating capacity of the bed, since excessive feeding will cause the bed to cool thereby resulting in a retardation of the decomposition of the $MgCl_2$.

The bed particles also are heated by a burning of the fuel, generally referred to at 13a, within the bed itself. Significantly, the direct burning of fuel within the bed itself creates very high temperatures, approaching flame temperatures, directly on the surface of the magnesia particles thereby accelerating the decomposition reactions. The bed temperature is maintained from about 525° to 950° C., preferably 700° to 950° C., in a conventional manner wherein the gas mixture is caused to move upwardly through the reactor at a rate sufficient to suspend the solid particles therein.

Effluent gases 17 and elutriated fine solids 17a pass from the reactor 11 into a cyclone separator 18 wherein they are separated. The elutriated fine solids 17a, consisting mainly of magnesium oxide, are of 50 to 325 mesh size and are returned directly to the fluidized bed through passage 19 to serve as fresh nuclei in the reactor. Alternatively, the solids 17a may also be returned to the reactor in a manner such that they are slurried into the input brine. The effluent gases 17 pass from the cyclone separator into a heat exchanger 15 where they are cooled to about 350°–400° C. by air passing through passage 20. The heated air exits from the heat exchanger 15 through line 21 and is preferably recycled through the combustion chamber 16 into the reactor 11.

The gas leaving the heat exchanger through exit line 22 contains HCl, $H_2O$, and combustion products. The gas passes through a scrubber 23 in which the gas is contacted with water, entering the scrubber through pipe 24, to absorb the HCl to form dilute hydrochloric acid which passes from the scrubber through line 25. The dilute HCl content is from about 1 to 13 weight percent which is recovered in a suitable container, not shown. The combustion products substantially exit from the scrubber as overhead gases through line 26 and are discarded therefrom.

During the process, the heavier magnesia-calcium chloride particles 27, i.e., those larger than about 10 mesh median size, fall from the fluidized bed and are discharged from the lower portion of the reactor, while still hot, through line 28 to a cooler 29. The hot particles are cooled to about 20 to 100° C. in the cooler 29 and then washed with water in chamber 30 one or more times to decrease the content of water-soluble salts, e.g., calcium chloride, therein. As a result, a particulate magnesia product is recovered in a vessel 31, said product having a magnesium oxide content of at least 90 weight percent. A portion of the magnesia product is preferably recycled through line 32 into the reactor 11 so as to maintain the calcium chloride content of the bed below about 15 weight percent.

The following examples are illustrative of our invention.

Example 1

Aqueous brine solution containing 29.1% $MgCl_2$, 6.0% $CaCl_2$, 1.1% NaCl and 0.7% KCl, by weight, was sprayed at a rate of 102 pounds per hour for 10.8 hours into a fluid bed reactor lined with fire brick having a cross-sectional area of 1.77 square feet and a static bed depth of 4.6 feet.

The bed initially consisted of 920 pounds of magnesia particles. Distribution of particle size at the start of the run, using U.S. standard screens, was approximately 6 to 40 mesh material.

The magnesia particles at the start of the run had the following composition:

| Component— | Weight percent |
|---|---|
| MgO | 82.5 |
| CaO | 3.9 |
| $MgCl_2$ | 2.2 |
| $CaCl_2$ | 5.8 |
| $SiO_2$ | 5.5 |

The fluidizer bed was maintained at an average temperature of about 730° C. by burning natural gas at 10.5 cubic feet per minute (standard conditions) within the bed itself. Fluidization was achieved by burning this amount of gas with 189 cubic feet per minute of air (standard conditions). This is equivalent to a fluidization velocity of 7 feet per second.

The hot gases exited from the reactor as overhead and were conducted through a cyclone separator to remove elutriated fine solids, the gases were then passed through a water-scrubber and discharged.

After 10.8 hours, a total of 1120 pounds of solids were recovered, 960 pounds from the reactor and 160 pounds from the cyclone separator, thus representing a recovery of solids of about 94%.

The particles recovered from the reactor had the following composition:

| Component— | Weight percent |
|---|---|
| MgO | 75.0 |
| CaO | 0.7 |
| $MgCl_2$ | 1.4 |
| $CaCl_2$ | 16.5 |
| $SiO_2$ | 6.5 |

Particle size distribution of solids recovered from the reactor was 1.9 weight percent on 6 mesh and 99.2 weight percent on 40 mesh whereas size distribution of solids from the cyclone separator was 3.5 weight percent on 30 mesh and 99.5 weight percent on 200 mesh.

Gas discharged from the cyclone separator contained 1.8% (volume basis) HCl indicating virtually complete decomposition of $MgCl_2$.

Example 2

A process similar to that described in Example 1 was carried out and the product from the reactor was recovered and then slurried and filtered three times with water at 90–100° C. resulting in a marked decrease in calcium ion and chloride ion content thereof as indicated in the table presented below. Values are in weight percent.

TABLE 1

| Component | Before Washing | After Washing |
|---|---|---|
| MgO | 75.39 | 89.41 |
| $SiO_2$ | 4.5 | 5.3 |
| Calcium ion | 6.0 | 0.8 |
| Chloride ion | 8.14 | 0.35 |
| Sodium ion | 0.67 | <0.1 |
| Potassium ion | 1.94 | <0.1 |

Example 3

In Example 1, the produce was contaminated with $SiO_2$ from the refractory lined reactor walls. The reactor was relined with magnesia brick to eliminate this contamination and the following run was made:

Aqueous brine solution containing an average of 25.6 weight percent $MgCl_2$, 6.5 weight percent $CaCl_2$, 0.5 weight percent NaCl, and 0.5 weight percent KCl was sprayed at a rate of 114 pounds per hour for 94 hours into a fluid bed reactor having a cross sectional area of 1.77 square feet and a static depth of 5 feet.

The bed initially consisted of 1000 pounds of 95.6 weight percent MgO. Distribution of particle size at start of run, using U.S. standard screens, was approximately 10 to 50 mesh material—about 750 microns median size.

The fluidized bed was maintained at an average temperature of 925° C. by burning natural gas at 10 s.c.f.m. within the bed itself, and 4.7 s.c.f.m. in a Dutch oven air preheater. Fluidization was achieved by burning this amount of gas with 180 s.c.f.m. air which is equivalent to a fluidization velocity of 9 feet per second.

During operation of the brine feed, the bed particles tended to grow. The rate of growth was controlled between (16–18 mesh) 950–1150 microns median size by recycle of about 1.9 pounds of −20 mesh fines per pound of brine solids. The fines recycled consisted of 46% cyclone fines and 54% magnesia fines.

The hot gases exited the reactor as overhead and were conducted through a cyclone separator to remove elutriated fine solids, the gases containing 1.7 volume percent HCl, then passed through a water scrubber and then discharged to atmosphere.

During a 94-hour period of operation, 1950 pounds of brine solids and 1774 pounds of recycle solids were fed to the reactor. At the end of operation, 3831 pounds of product solids were collected for an 81% solids recovery. The equilibrium bed solids analysis was 83.2 weight percent MgO, 13.4 weight percent $CaCl_2$, 1.1 weight percent CaO and 1.5 weight percent NaCl plus KCl. The crude product was slurried and filtered three times with water at 90–100° C. The washed product contained 99 weight percent MgO.

The foregoing examples are merely illustrative of the application of the principles of the invention. It will be apparent to those skilled in the art that numerous modifications may be made therein without departure from the spirit of the invention or the scope of the appended claim.

We claim:

1. A continuous process for the production of a high-grade magnesium oxide product from magnesium chloride brine having a calcium chloride content of from about 15 to 25 weight percent based on the weight of the magnesium chloride component, which comprises:
    (a) heating the brine at temperatures of from about 700° to 950° C. in a fluidizer bed of particles having a magnesium oxide content of at least about 80 weight percent and a calcium chloride content of no more than about 15 weight percent, based on the weight of said particles, to produce a particulate magnesium oxide containing calcium chloride;
    (b) recovering the particulate magnesium oxide from the fluidized bed;
    (c) washing the particulate magnesium oxide with water to separate the calcium chloride to produce a high-grade magnesium oxide product having a magnesium oxide content of about 99 weight percent and a calcium oxide content no greater than about 1 weight percent, based on the weight of the product; and
    (d) maintaining the calcium chloride content of the fluidized bed particles at no more than about 15 weight percent by recycling at least a portion of the high-grade magnesium oxide product to the fluidized bed, thereby preventing the bed particles from sticking together to form an agglomerate mass.

References Cited

UNITED STATES PATENTS

| 1,661,043 | 2/1928 | Koehler | 23—201 |
| 2,191,561 | 2/1940 | Farnsworth et al. | 23—201 X |
| 2,954,277 | 9/1960 | Thomsen | 23—201 |
| 3,251,650 | 5/1966 | Bengston et al. | 23—201 |

OSCAR R. VERTIZ, Primary Examiner

G. T. OZAKI, Assistant Examiner

U.S. Cl. X.R.

23—90